United States Patent
Heckmann

[19]

[11] Patent Number: 5,638,967
[45] Date of Patent: Jun. 17, 1997

[54] VEHICLE WITH A BUILT-ON SWIVELING MAST AND A FRAME SUPPORT

[75] Inventor: Horst Heckmann, Sprockhovel, Germany

[73] Assignee: Schwing GmbH, Herne, Germany

[21] Appl. No.: 625,776

[22] Filed: Mar. 29, 1996

Related U.S. Application Data

[63] Continuation of Ser. No. 362,280, Dec. 22, 1994, abandoned.

[30] Foreign Application Priority Data

Dec. 28, 1993 [DE] Germany .......................... 43 44 779.1

[51] Int. Cl.⁶ ........................................................ B66C 23/78
[52] U.S. Cl. ...................... 212/302; 212/304; 280/763.1; 280/766.1
[58] Field of Search ................................ 212/301, 302, 212/304, 305, 306, 303; 280/763.1, 764.1, 765.1, 766.1

[56] References Cited

U.S. PATENT DOCUMENTS

| | | | |
|---|---|---|---|
| 2,192,033 | 2/1940 | Dalton | 212/55 |
| 2,740,538 | 4/1956 | Felkner | 212/145 |
| 3,194,414 | 7/1965 | Tourneau | 212/145 |

FOREIGN PATENT DOCUMENTS

| | | |
|---|---|---|
| 31 22 725 A1 | 12/1982 | Germany . |
| 3122725 | 12/1982 | Germany . |
| 43 44 779 A1 | 6/1995 | Germany . |

OTHER PUBLICATIONS

"Hightech aus Deutschland Entwicklung und Zukunft der Betonverteilermasten", *40 Jahre BMT Baumaschine + Bautechnik*, pp. 72–79.

*Primary Examiner*—Thomas J. Brahan

[57] ABSTRACT

Figure 1:
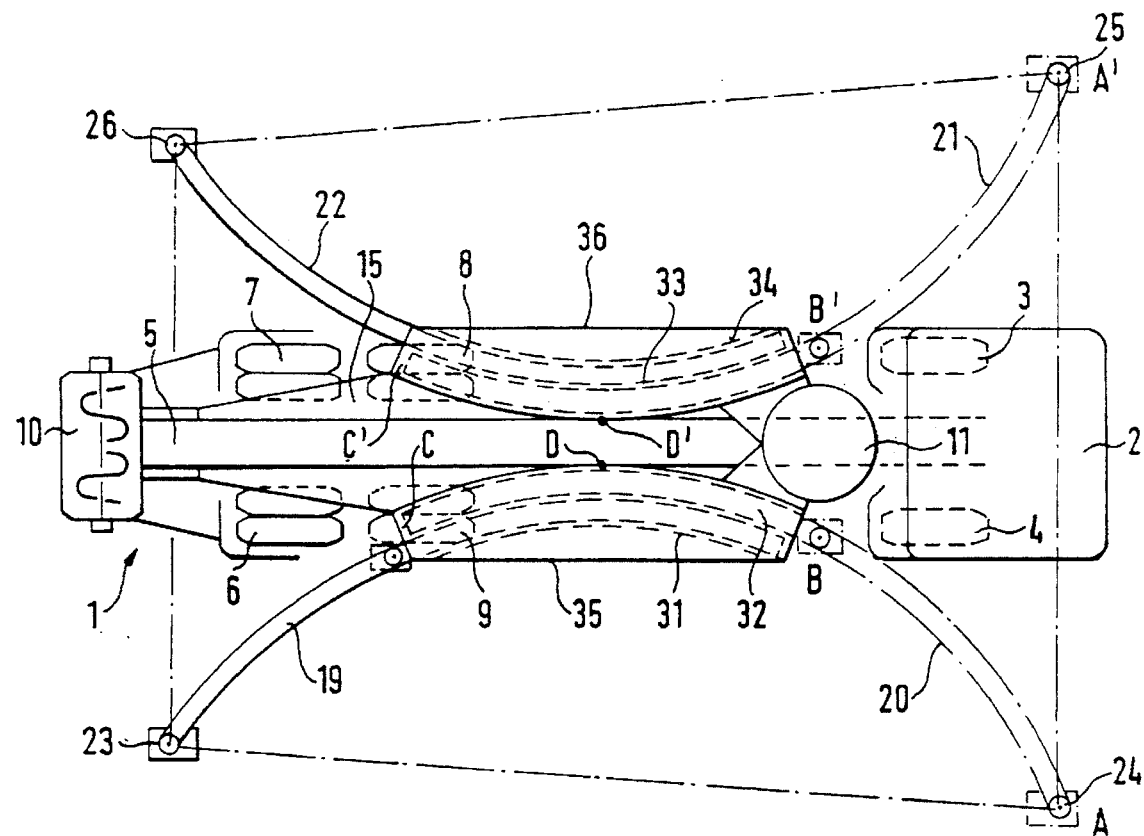

In a vehicle (1) having a swiveling mast (12) which is built on a slewing gear (11) disposed on a frame and has associated therewith a frame support (18) including arcuate guides fixed on the vehicle for beams (19 to 22) to be drawn into the vehicle profile, the guides (31 to 34) and the beams being disposed in a horizontal plane and the guides (31 to 34) extending substantially between the longitudinal sides (35, 36) of the vehicle profile, the invention provides for the guides (31 to 34) to be disposed tangentially to the longitudinal direction of the vehicle, each extending inwardly from one of the longitudinal sides (35, 36) of the vehicle profile substantially to the center (5) of the vehicle and from there further to the same longitudinal side (35, 36) of the vehicle profile (FIG. 1).

25 Claims, 5 Drawing Sheets

VEHICLE WITH A BUILT-ON SWIVELING MAST AND A FRAME SUPPORT

BACKGROUND OF THE INVENTION

This is a file wrapper continuation of application Ser. No. 08/362,280 filed Dec. 22, 1994, now abandoned.

The present invention relates to a vehicle with a built-on swiveling mast and a frame support according to the preamble of claim 1.

Such vehicles are intended as road vehicles for various purposes. The invention relates in particular to vehicles with a built-on concrete pump, the mast serving as a distributing boom which bears a concrete delivery pipe so as to discharge the concrete delivered by the pump. The invention will be explained in more detail in the following substantially with reference to this preferred embodiment of the invention.

Powerful vehicles of the type in question here must generally be provided with greatly projecting masts. With traveling concrete pumps the necessary projections of the mast require it to be subdivided with operating joints which also permit it to fold up for the driving mode. Such masts reach considerable heights and trigger a moment of tilt dependent on the projection and the length of the mast. The frame support removes the moment of tilt onto the base of the vehicle, thereby preventing the vehicle from overturning with the mast. The development of such vehicles is subject to the necessity of providing constantly increasing mast lengths and radii due to the increasing requirements while still maintaining the vehicle profile for the driving mode. With traveling concrete pumps it is generally important not to fall below the permissible vehicle width in order to avoid restrictions for special transports that are required if the vehicle has excess widths.

The frame support generally takes place on four points, in particular when the slewing gear of the mast permits an unlimited pivoting angle. This means for the support that lesser problems arise with moments of tilt substantially about the transverse axis of the vehicle than with support of moments of tilt about the longitudinal vehicle axis. One reason for this is that the vehicle weight produces a considerably greater moment about the transverse axis than about the longitudinal axis, which counteracts the moment of tilt of the mast. However since the slewability of the mast can in most cases not be limited in the slewing gear to moments of tilt about the transverse axis, long beams result for the support of corresponding mast lengths and it is difficult to house these beams within the vehicle profile for the driving mode.

The invention starts out from a known vehicle with a concrete pump and a distributing boom built on its chassis, the slewing gear of the boom being built on the chassis or a subframe of the chassis in the direct vicinity of the driver's cab, as is customary in such vehicles, while the feeding hopper of the concrete pump is located at the tail of the vehicle and parts of the concrete delivery device are disposed in the center of the vehicle. In this vehicle four beams are provided for the four-point frame support. The front frame support has arcuate telescopes fixed on the vehicle in which the beams are disposed in such a way that they start between driver's cab and slewing gear and can be extended toward the front. The two rear beams, by contrast, are housed in linear telescopes.

The guides and the beams displaceable therein must remain within the two lateral limits of the vehicle profile for the driving mode, the guides being somewhat shortened to permit the bottom supports disposed at the free ends of the beams and usually adapted to be run in and out to be housed within the vehicle profile for the driving mode. For the front frame support this results in a limitation to short extraction lengths of the beams and accordingly shortened guides. The convex curvature of the guides and beams pointing rearward toward the tail of the vehicle also causes the supports to be extended toward the front and into the vicinity of the longitudinal vehicle axis, thereby shortening the lateral distance between the supporting points and the longitudinal vehicle axis. The known vehicle is therefore not suitable for masts with great lengths and projections or for slewing gear with unlimited swiveling.

The invention goes a different way, its basic idea being rendered in claim 1. Further features of the invention are the object of the subclaims.

According to the invention the arcuate shape of the guides and beams oriented tangentially to the longitudinal center causes the supports to be run out further to the side of the vehicle, thereby effectively counteracting the tilting of the vehicle about one or the other longitudinal vehicle side. Since the guides approach the particular profile side of the vehicle with their two end points, one obtains beams whose length depends on the necessary span and which can be housed within the vehicle profile for the driving mode. These beams are the longer the closer the apex of the curvature of the guides approaches the center of the vehicle. This is limited only by other structures built on the vehicle that must be housed in the longitudinal center of the vehicle, as is the case for example with part of the delivery device for traveling concrete pumps.

At least the front frame support is realized in this way according to the invention. This takes account of the fact that, in vehicles where the slewing gear of the mast is shifted from the center of the vehicle toward the front, the lateral span of the front frame support is the critical one and must therefore especially be increased. This is regularly the case with traveling concrete pumps, resulting from the concrete pump being housed on the vehicle frame. Due to the concrete pump being charged at the tail of the vehicle the front projections of the mast are also generally preferred, if local conditions permit.

Telescopes are also preferably used in the inventive vehicle to guide the beams. This is the object of claim 2.

An optimization of the length of the beams and guides results from the features of claim 3. Since the guides of the support start on the slewing gear and are located on the arc of a circle, the construction is not only simplified but it is also possible to shift the curves of the guides far into the center of the vehicle. In these embodiments of the invention a rear support is always provided as well so that an additional support toward the rear results on each loaded vehicle side. The necessary guide for this should in its turn start in the area of the tail of the vehicle in order to reach an optimal span. Claim 4 describes an embodiment of the invention wherein a four-point support results on each longitudinal vehicle side.

Although special attention is paid to vehicles of the inventive type with the slewing gear shifted from the center of the vehicle toward the front for front frame support due to the described conditions of application, it has proven expedient to transfer the form of the front frame support to the rear frame support. This is the object of claim 5. Such vehicles have the advantage of also shifting the rear supporting points further to the side of the vehicle, thereby counteracting the tilting of the vehicle about its longitudinal vehicle axis.

With this type of support the guides are disposed concentrically in a common horizontal plane according to claim 5, so that one gains additional room on the vehicle in the planes located thereabove and therebelow. The different embodiment of the invention wherein the guides are disposed in horizontal parallel planes has the effect, by contrast, that the guides have an optimal length and can be housed within the vehicle profile, whereby the available room can be utilized for the guides in terms of its height.

On the other hand the invention offers sufficient freedom with respect to the details of construction necessary for its realization. Embodiments with the features of claim 7 permit the rear support to be formed differently from the front support depending on the requirements of a given case, if this is necessary for certain reasons. One can thereby realize the features of claim 8 which provide the rear frame support with a joint for connecting the guides with the frame. This joint is disposed in the area of the slewing gear to permit the available length on the vehicle profile to be fully utilized.

However such joints can also be shifted further toward the tail of the vehicle with the features of claim 9, which generally results in optimal spans of the rear frame support as well.

The preferred embodiment of the invention wherein the beams are housed in telescopes also permits the handling of the frame support to be substantially simplified, since the beams, which are heavy due to their length and their load, need no longer be moved by hand but have their own drive. This moreover increases safety, since Such drives can be designed so as to be effective over the total span.

Figure 2:
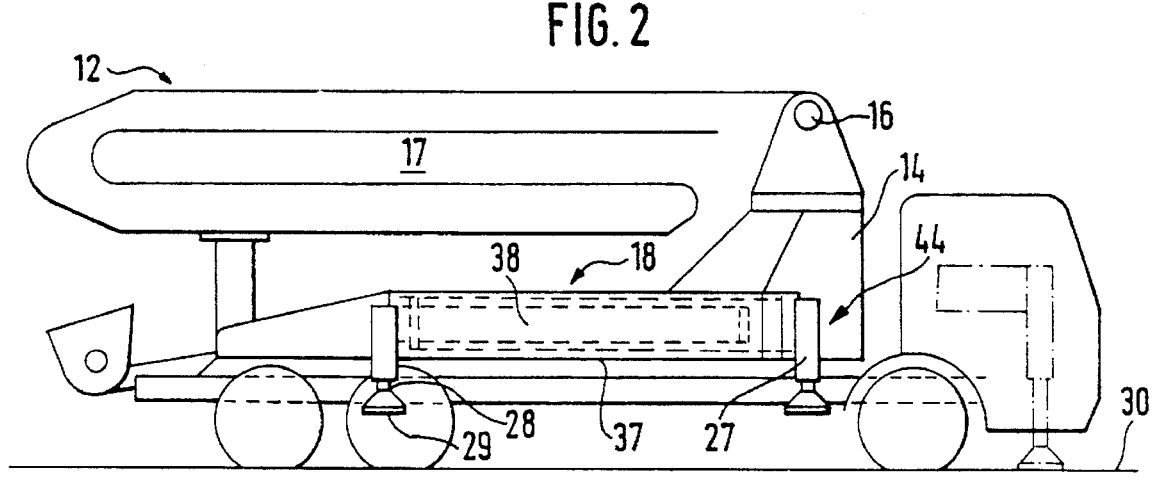
Figure 3:
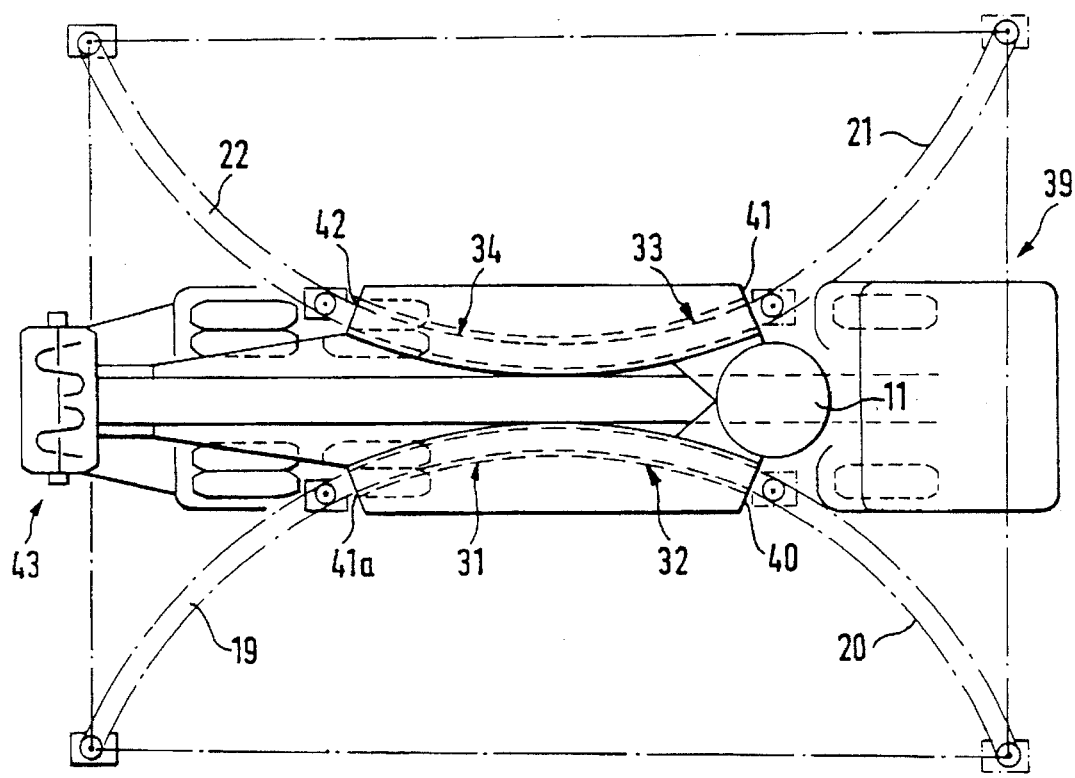
Figure 4:
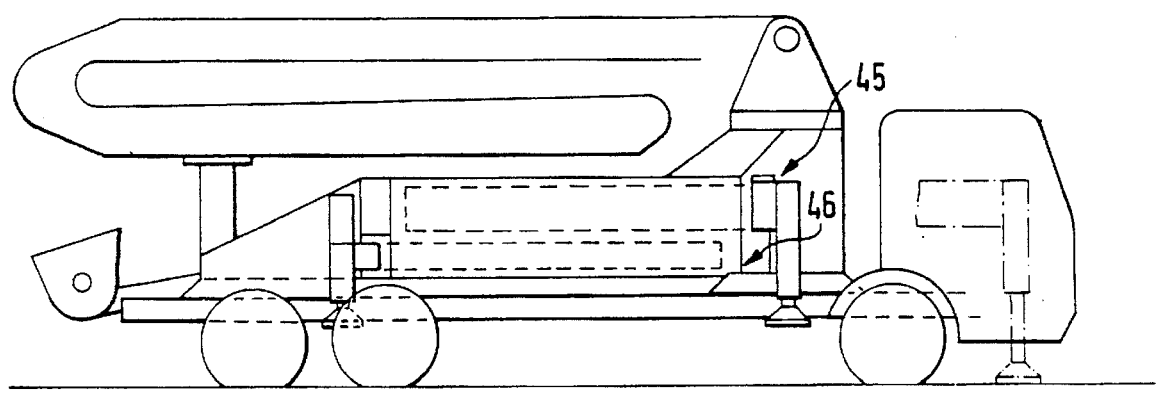
Figure 5:
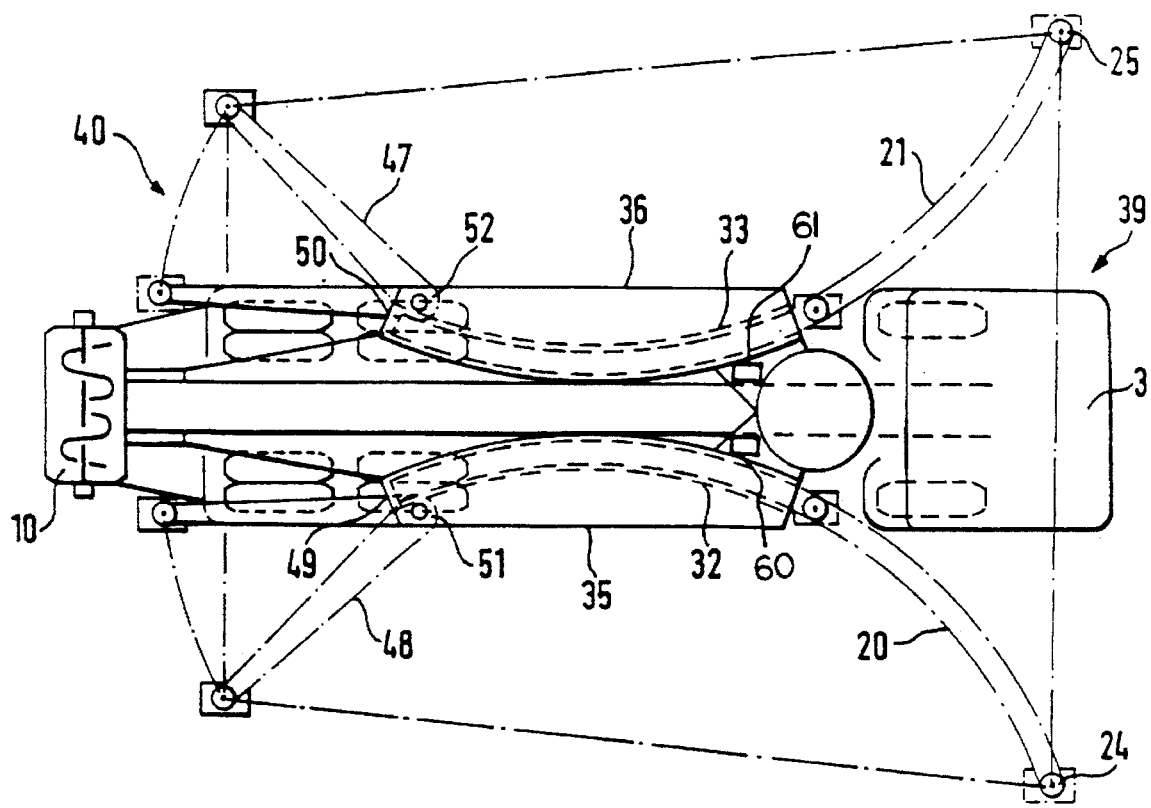
Figure 6:
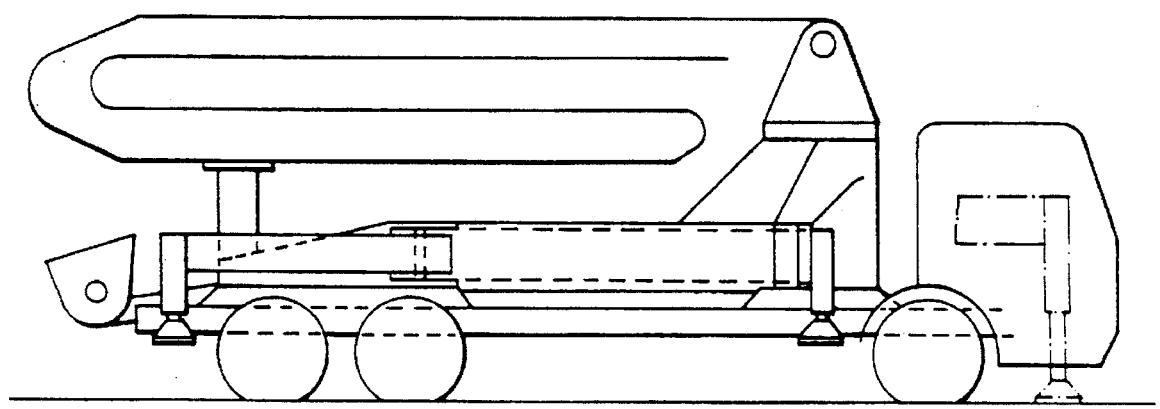
Figure 7:
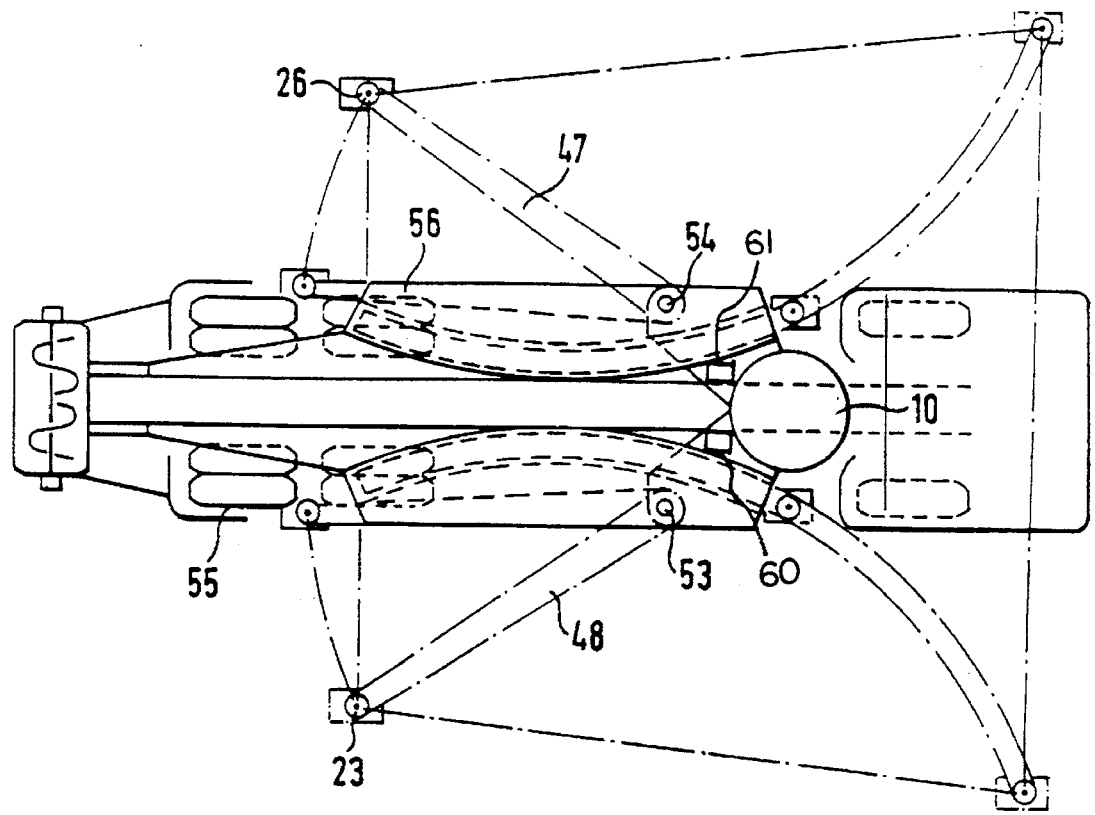
Figure 8:
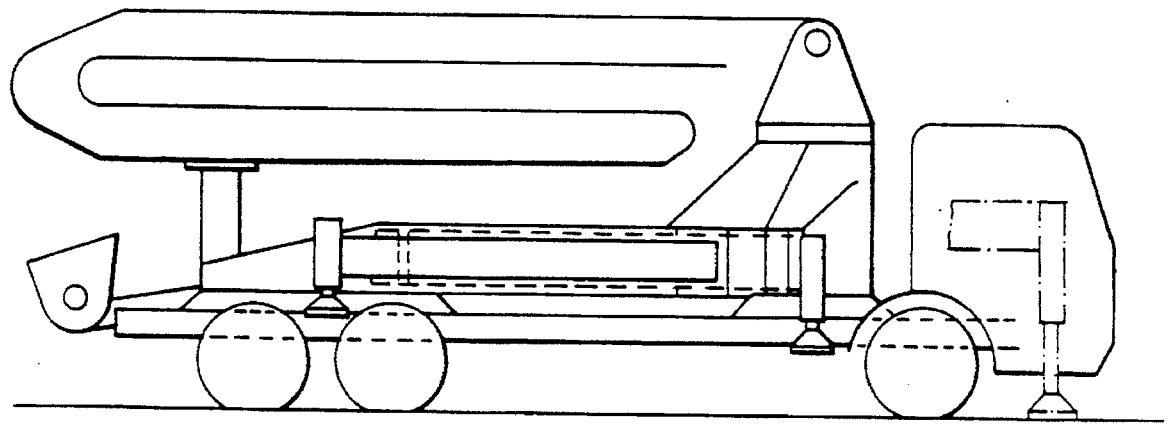
Figure 9:
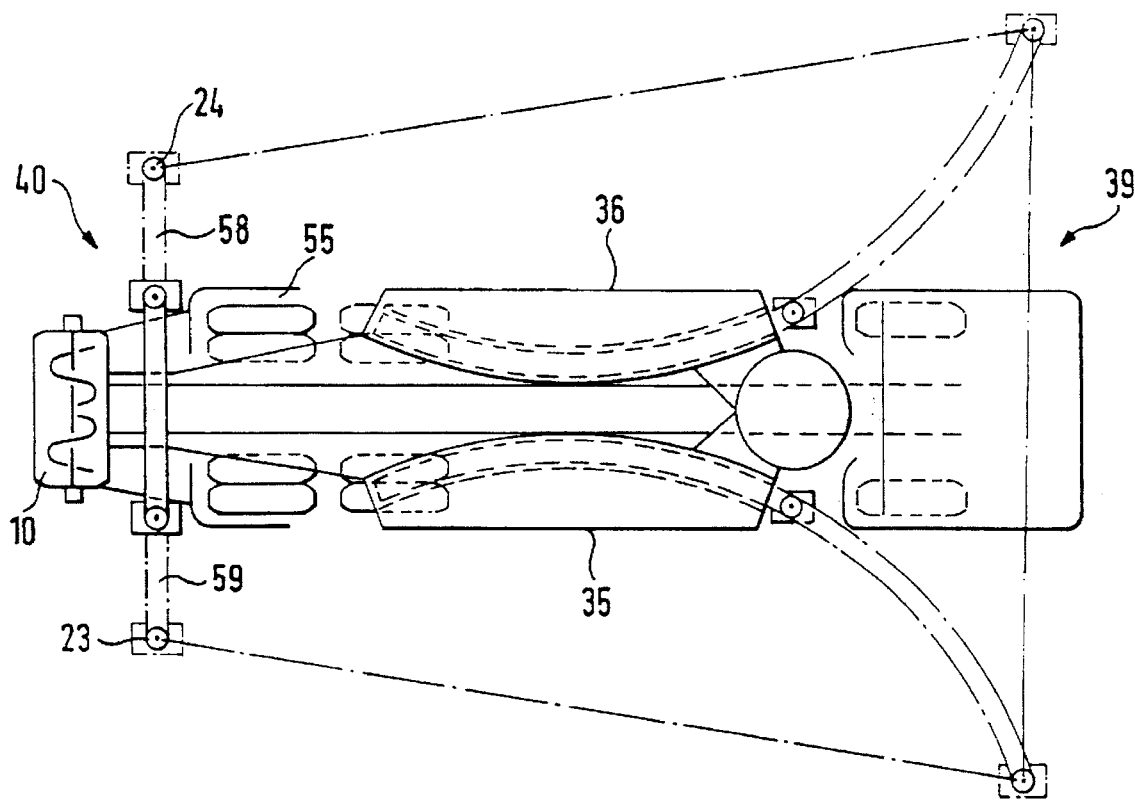

Details, further features and other advantages of the invention will emerge from the following description of embodiments with reference to the figures in the drawing, in which FIG. 1 shows a plan view of a first embodiment of the invention, FIG. 2 shows a side view of a first embodiment of the invention, FIG. 3 shows a further embodiment represented as in FIG. 1, FIG. 4 shows the embodiment of FIG. 3 represented as in FIG. 2, FIG. 5 shows a modified embodiment represented as in FIGS. 1 and 3, FIG. 6 shows the embodiment of FIG. 5 represented as in FIGS. 2 and 4, FIG. 7 shows a further modified embodiment represented as in FIGS. 1, 3 and 5, FIG. 8 shows the object of FIG. 7 in a view corresponding to FIGS. 2, 4 and 6, FIG. 9 shows a different embodiment represented as in FIGS. 1, 3, 5 and 7, and FIG. 10 shows a view of the object of FIG. 9 represented as in FIGS. 2, 4, 6 and 8.

FIGS. 1 to 9 show by dash-dot lines the drawn-out lengths of the beams of the frame support, whereby the dashed lines show the details not appearing in the Figures but necessary for comprehension.

As indicated by the embodiment example in FIGS. 1 and 2, truck chassis 1 has driver's cab 2 and single-tired steering assembly 3, 4 at the front and chassis beam 5 on which double-tired rear axles 6 to 9 are suspended. According to the embodiment example a concrete pump is built on chassis 5, its feeding hopper 10 for supplying the concrete pump from a mixer being disposed at the tail.

Behind driver's cab 2 there is slewing gear 11 of concrete distributing boom or mast 12. The slewing gear is seated on frame 14 which is in its turn seated on the chassis frame via subframe 15. Mast 12 is hinged via horizontal working joint 16 and divided into sections that are in turn interconnected with working joints not shown. This permits the mast to fold up as apparent from FIG. 2, shown at 17. On the other hand the mast can be extended by being unfolded, which is not shown specifically in the figures.

A frame support designated in general as 18 is disposed on subframe 15. The embodiment example of FIGS. 1 and 2 involves a four-point support with the aid of four beams 19 to 22 which bear supports 23 to 26 at their free ends. These supports are of substantially identical design and telescopic. Outer telescopes 27 are seated on particular beams 19 to 22, while inner telescopes 28 are provided with base plates 29 which transmit the supporting pressure to base 30.

In the view of FIG. 2 supports 23 to 26 are shown by unbroken lines for the driving mode. On the right in FIG. 2 in the area of driver's cab 2, i.e. in the dash-dot representation of FIG. 1, the drawn-out supports are rendered by dash-dot lines. This indicates that when supports 23 to 26 are drawn out the vehicle is lifted off standing surface 30 and a torsion-resistant construction comprising frame 15, beams 19 to 22 and supports 23 to 26 removes the forces from mast 12 onto standing surface 30.

Guides 31 to 34 are associated with beams 19 in a horizontal plane. These guides are located substantially between longitudinal sides 35, 36 of the vehicle profile. However they are disposed tangentially to the longitudinal direction of the vehicle and each extend inwardly from one of longitudinal sides 35, 36 of the vehicle profile substantially to the center of the vehicle, which is given by beam 5 in the embodiment example, and from there further to the same longitudinal side 34, 35 of the vehicle profile.

The guides are housed in hollow section portion 37, but not specifically shown. They may be slideways that ensure rotationally firm guidance for beams 19 to 22. To guarantee better running of beams 19 to 22 in hollow sections 37 the guides can then also consist wholly or partly of roll bodies. Together with beams 37 beams 19 to 22 form telescopes that are designated in general as 38 in FIG. 2.

As indicated in particular by the representation in FIG. 3, guides 32, 33 of front frame support 39 with supports 24 and 25 start at 40 and 41 in the area of slewing gear 11 and follow the arc of a circle. Frame support 39 is supplemented by further frame support 43 associated with the tail of the vehicle, its guides 31 and 34 starting at 41 and 42 at tail 43. Starting refers to the slip-over end of telescope 38 of guides 31 to 34.

Frame supports 39 and 40 each comprise a pair of beams 19, 22 or 20, 21 so that one beam of pair of beams 19, 22 or 20, 21 is disposed on each vehicle side given by vehicle profile 35 or 36. This four-point support has the advantage that the vehicle can be raised as a whole, as apparent from the dash-dot representation in FIG. 1, as soon as beams 19 to 22 are run out of their guides and supports 23 to 26 have been run out.

In the embodiment examples of FIGS. 1 and 2 all guides 31 to 34 are arcuate and disposed as described above. The embodiment example of FIG. 1 differs from the embodiment example of FIG. 2 only in that guides 31 to 34 are disposed concentrically in a common horizontal plane according to reference arrow 44, as apparent from FIG. 2. By contrast, guides 31 to 34 are mounted one above the other in horizontal parallel planes that are indicated by reference arrows 45, 46 in FIG. 4.

In the embodiment examples of FIGS. 5 to 9, however, front frame support 39 and rear frame support 40 are formed differently. All embodiment examples have in common that front frame support 39 has arcuate guides 32, 33 with accordingly curved beams 20, 21. This obtains maximum spans beside vehicle 1 at the height of the driver's cab, as shown in the embodiment examples of FIGS. 1 and 3. In the embodiment examples of FIGS. 5 to 8, frame support 40 formed differently from frame support 39 uses rockers 47 and 48 which have relatively smaller spans than beam 20 and 21. This results in, not the rectangle shown in the embodiment example of FIGS. 3 and 4 having supports 23 to 26 disposed in its corners, but rather a trapezoid whose shorter side is associated with the tail of the vehicle with prefeeding hopper 10 of the concrete pump. The rocker joints are disposed beside inner ends 49 and 50 of guides 32, 33 at 51 and 52. This ensures that the total length of rockers 48 can be housed within the profile between profile sides 35, 36 when the vehicle goes into the driving mode.

In contrast to the embodiment example of FIGS. 5 and 6, rocker joints 53, 54 of the embodiment example of FIGS. 7 and 8 are likewise disposed in the direct vicinity of slewing gear 10 so that supports 23, 26 are located for the driving mode between rear wheel axles 55, 56 provided as rigid axles, while in the embodiment example of FIGS. 5 and 6 they come to lie beside front supports 24, 25.

Figure 10:
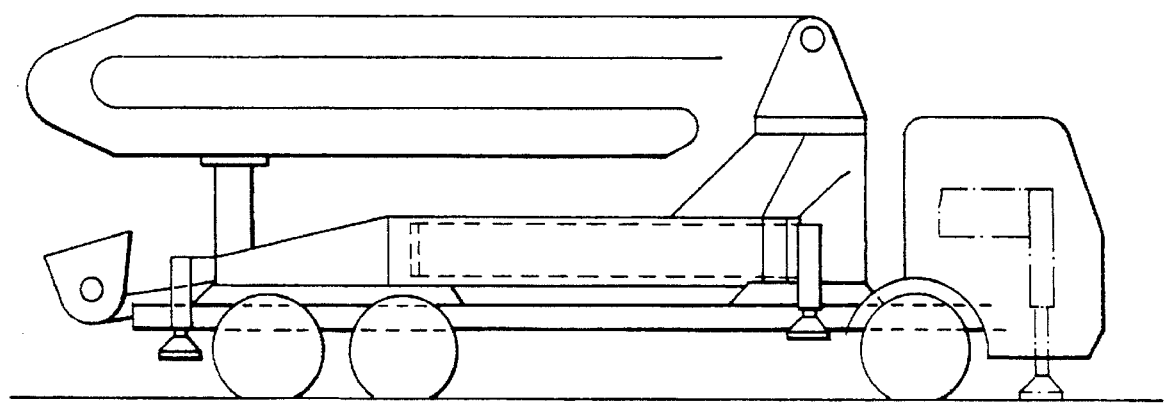

In the embodiment example of FIGS. 9 and 10 front frame support 39 again corresponds to all embodiments. However rear frame support 40 uses not rockers but rather draw-out transverse beams 58, 59 that are disposed behind trailing rigid axle 55 and in front of prefeeding container of the concrete pump. Supports 23, 24 can therefore be drawn in between longitudinal profile sides 35, 36 of the vehicle in the driving mode.

The construction of the telescopes is not shown specifically. The beams are maneuvered by a drive means 60, 61, shown generally in block form in FIGS. 5 and 7. With a mechanical drive the energy transmission for running the beams in and out can take place via a motor pinion which meshes with a toothed rack bent in accordance with the curvature of the arc-shaped telescope and is driven by a motor fixed on the chassis. The circular arc shape of the telescopes is assumed by the embodiment of FIGS. 1 and 2, among others. The radius and thus the position of the telescope arc is determined by points A, B, C. Point A results from the position of support 21 or 25 in the run-out state. This position is in its turn given by the moment of reaction opposing the moment of tilt of the mast. Point B is passed through by beam 20, 21 and marks the position of support 24, 25 in the driving mode of the vehicle. It is adjoined by the slip-over end of the telescope. Point C lies on one of longitudinal vehicle sides 35, 36 and simultaneously marks the end of the telescope guidance, i.e. the path that beams 20, 21 can cover before they protrude outwardly from the vehicle profile.

The distance between points D (D') protruding furthest inward toward the center of the vehicle and the two inner guides 32, 33 marks a free space for the units mounted on the center of the vehicle chassis.

Since the telescopes are formed as statically stable box frame constructions, beams 20, 21 need not have an exactly arcuate form. In these cases the drive means can also be a rope winch, the traction rope being guided so as to lie on the outer arcuate side of the telescope and the winch being driven by a motor fixed on the chassis. The drive can also be provided via a chain hoist that is driven via a chain sprocket by a motor fixed on the chassis.

In general one will give a box-shaped rectangular form to the profile section realizing the telescope guidance. The required rotational firmness about the axis of the beams then already results from the profile. However the cross section can also be tubular.

I claim:

1. A vehicle having a head, a tail and a pair of sides longitudinally extending between the head and the tail of the vehicle to form a profile of the vehicle, the vehicle comprising:

a frame;

a slewing gear disposed on the frame;

a swiveling mast built on the slewing gear;

a first frame support coupled to the frame of the vehicle, the first frame support including:

at least one arcuate beam movably coupled to the frame in a substantially horizontal plane; and at least one guide coupled to the frame and extending inwardly from one of the longitudinal sides of the vehicle profile, wherein said at least one guide guides movement of said at least one beam in a substantially horizontal plane tangentially to the longitudinal direction of the vehicle so that said at least one beam may be drawn into the vehicle profile.

2. The vehicle of claim 1 wherein the vehicle defines a hollow section portion in which said at least one guide is disposed and wherein said at least one beam is telescopically received within the hollow section portion.

3. The vehicle of claim 2 wherein the hollow section portion has a rectangular cross-section.

4. The vehicle of claim 2 wherein the hollow section portion is tubular.

5. The vehicle of claim 1 wherein said at least one guide lies on an arc of a circle.

6. The vehicle of claim 1 wherein said at least one arcuate beam is movable between a first position and a second position, wherein said at least one arcuate beam extends from the slewing gear outward from the vehicle profile towards the head of the vehicle in the first position and wherein said at least one arcuate beam is substantially positioned within the vehicle profile in the second position.

7. The vehicle of claim 1 wherein said at least one arcuate beam is movable between a first position and a second position, wherein the arcuate beam extends outward from the vehicle profile towards the tail of the vehicle in the first position and wherein said at least one arcuate beam is substantially positioned within the vehicle profile in the second position.

8. The vehicle of claim 1 wherein said at least on guide lies on an arc of a circle and extends from a location proximate the slewing gear towards the tail of the vehicle.

9. The vehicle of claim 1 including:

a second frame support coupled to the frame of the vehicle, the frame support including:

at least one arcuate beam movably coupled to the frame in a substantially horizontal plane; and at least one guide coupled to the frame and extending inwardly from one of the longitudinal sides of the vehicle profile, wherein said at least one guide guides movement of said at least one beam of the second frame support in a substantially horizontal plane tangentially to the longitudinal direction of the vehicle so that said at least one beam of the second frame support may be drawn into the vehicle profile.

10. The vehicle of claim 9 wherein the first and second frame supports each include a pair of arcuate beams movably coupled to the frame in a substantially horizontal plane on opposite sides of the vehicle.

11. The vehicle of claim 1 further including:
means for selectively moving said at least one arcuate beam inward and outward from the first frame support.

12. The vehicle of claim 11 wherein the means for selectively moving includes:
a rope winch having a traction rope engaging said at least one beam; and
a motor coupled to the frame for driving the rope winch.

13. The vehicle of claim 11 wherein the means for selectively moving includes:
a toothed rack coupled to said at least one beam; and
a motor connected to the frame having a pinion meshing with the toothed rack for driving the toothed rack.

14. The vehicle of claim 11 wherein the means for selectively moving includes:
a chain hoist having a chain engaging said at least one beam; and
a motor fixed to the frame, wherein the motor includes a chain sprocket for driving the chain hoist.

15. A vehicle having a head, a tail and a pair of sides longitudinally extending between the head and the tail of the vehicle to form a profile of the vehicle, the vehicle comprising:
a frame;
a slewing gear disposed on the frame;
a swiveling mast built on the slewing gear;
a first frame support coupled to the frame of the vehicle, the first frame support including:
a first arcuate beam movably coupled to a first side of the frame in a substantially horizontal plane, the first arcuate beam being movable between a first position and a second position, wherein the first arcuate beam extends from the slewing gear towards the head of the vehicle outward from the profile of the vehicle in the first position and wherein the first arcuate beam is substantially within the profile of the vehicle in the second position;
a second arcuate beam movably coupled to a second opposite side of the frame in a substantially horizontal plane, the second arcuate beam being movable between a first position and a second position, wherein the second arcuate beam extends from the slewing gear towards the head of the vehicle outward from the profile of the vehicle in the first position and wherein the second arcuate beam is substantially within the profile of the vehicle in the second position.

16. The vehicle of claim 15 wherein the first arcuate beam and the second arcuate beam each include at least one guide coupled to the frame for guiding movement between the first and second positions.

17. The vehicle of claim 15 including:
a second frame support coupled to the frame of the vehicle, the second frame support including:
a first leg extending from the first side of the frame and a second leg extending from the second side of the frame, each leg being movable between a first position and a second position, wherein each leg extends from the frame towards the tail of the vehicle outward from the vehicle profile in the first position and wherein each leg is substantially withdrawn into the vehicle profile in the second position.

18. The vehicle of claim 17 wherein the first leg and the second leg each include an arcuate beam movably coupled to the frame in a substantially horizontal plane.

19. The vehicle of claim 17 wherein the first leg and the second leg each comprise rockers.

20. The vehicle of claim 15 including:
a second frame support coupled to the frame of the vehicle, the second frame support including:
a first leg extending from the first side of the frame and a second leg extending from the second side of the frame, each leg being movable between a first position and a second position, wherein each leg extends outward from the vehicle profile in a lateral fashion from the tail of the vehicle in the first position and wherein each leg is substantially withdrawn into the vehicle profile in the second position.

21. The vehicle of claim 20 wherein the first leg and the second leg each comprise draw-out transverse beams.

22. A vehicle having a head, a tail and a pair of sides longitudinally extending between the head and the tail of the vehicle to form a profile of the vehicle, the vehicle comprising:
a frame;
a slewing gear disposed on the frame;
a swiveling mast built on the slewing gear;
a first frame support coupled to the frame of the vehicle, the frame support including:
a first arcuate beam movably coupled to a first side of the frame in a substantially horizontal plane and a second arcuate beam movably coupled to a second opposite side of the frame in a substantially horizontal plane, wherein the first arcuate beam and the second arcuate beam are movable between a first position and a second position, wherein the first arcuate beam and the second arcuate beam extend from proximate the slewing gear towards the head of the vehicle outward from the profile of the vehicle in the first position and wherein the first arcuate beam and the second arcuate beam are drawn substantially within the profile of the vehicle in the second position; and
a first guide coupled to the frame for guiding movement of the first arcuate beam;
a second guide coupled to the frame for guiding movement of the second arcuate beam; and
a second frame support coupled to the frame of the vehicle, the second frame support including a first leg extending from the first side of the vehicle and a second leg extending from the second side of the vehicle, the first and second legs being movable between a first position and a second position, wherein the first and second legs extend towards the tail of the vehicle outward from the vehicle profile in the first position and wherein the first and second legs are drawn substantially within the profile of the vehicle in the second position.

23. The vehicle of claim 22 wherein the first and second legs each include:
an arcuate beam movably coupled to the frame in a substantially horizontal plane; and
a guide coupled to the frame for guiding movement of the arcuate beam between the first and second positions.

24. The vehicle of claim 22 wherein the first and second legs each comprise rockers.

25. The vehicle of claim 24 wherein the rockers are coupled to the frame proximate the slewing gear.

* * * * *